(No Model.)

M. M. M. SLATTERY.
CONTACT PIECE FOR ELECTRICAL APPARATUS.

No. 356,796. Patented Feb. 1, 1887.

Witnesses
Lauritz W. Möller
M. A. Thompson

Inventor.
Marmaduke M. M. Slattery,
by Wm. R. Macleod
his Atty

UNITED STATES PATENT OFFICE.

MARMADUKE M. M. SLATTERY, OF WOBURN, MASSACHUSETTS, ASSIGNOR TO THE SUN ELECTRIC LIGHT COMPANY, OF SAME PLACE.

CONTACT-PIECE FOR ELECTRICAL APPARATUS.

SPECIFICATION forming part of Letters Patent No. 356,796, dated February 1, 1887.

Application filed July 30, 1885. Serial No. 173,012. (No model.)

*To all whom it may concern:*

Be it known that I, MARMADUKE M. M. SLATTERY, of Woburn, county of Middlesex, State of Massachusetts, have invented certain new and useful Improvements in Contact-Pieces or Connections for Electric Apparatus, of which the following is a full, clear, concise, and exact description, reference being had to the drawings accompanying and forming a part hereof, in which—

Figure 1:
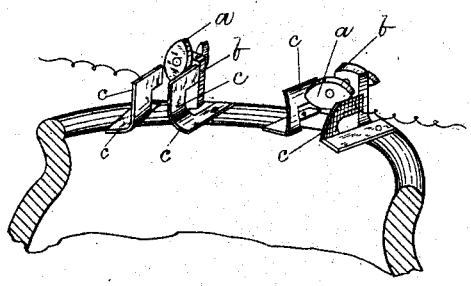
Figure 2:
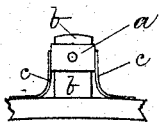

Figure 1 is a perspective showing my contact-pieces in connection with a battery-cell. Fig. 2 is an elevation.

The object of my invention is the construction of a suitable and efficient contact-piece particularly adapted for the connection of battery-wires with the electrodes of the cell, and by means of which the electrodes may be disconnected and quickly removed without disturbing the cell or its contents; and it consists in the device hereinafter more particularly described, by means of which I am enabled to attain this result.

The device will be readily understood from the following description, in which the letters of reference designate the various parts in the accompanying drawings.

A cross-piece, $a$, preferably of an oblong or oval shape, is pivoted between the contact or pressure springs $c$ to a support, $b$. These springs grasp the electrode and electrically connect it in the circuit. When it is desired to remove the electrode, it is only necessary to turn the cross-piece $a$ through a quarter of a circle, causing it to bear at either end upon the springs, thus pressing them apart, freeing and releasing the electrode. It will be observed that, as applied to a cell, as shown in the drawings, one pair of springs is used for each electrode, one or both of each pair being connected by spring-contact to the electrode, the circuit being then completed through the solution in the cell, the other electrode, and the other pair of springs. The cross-piece $a$ performs no electrode function other than that of allowing the springs to press upon the electrode, or the reverse, and may be of insulating material.

What I claim is—

1. The combination, with a galvanic cell and an electrode thereof, of the cross-piece $a$ and springs $c$, whereby by revolution of the cross-piece electrical connection or disconnection of the springs and electrode in the circuit may be effected, substantially as shown and described.

2. In a galvanic cell, a pressure spring or springs connected in the circuit of the cell, an electrode pressed upon by said springs, and a revoluble shaft carrying an arm disposed with relation to said spring or springs, whereby on revolution thereof said spring or springs are removed from contact with said electrode.

MARMADUKE M. M. SLATTERY.

Witnesses:
WM. A. MACLEOD,
M. A. THOMPSON.